United States Patent [19]
Kaizaki et al.

[11] 3,858,947
[45] Jan. 7, 1975

[54] DUST SEAL FOR ENDLESS TRACKS OF A TRACTOR

[75] Inventors: Hiroyuki Kaizaki, Takeshi Kato, both of Osaka-fu, Japan

[73] Assignee: Kabushi Kaisha Komatsu, Seisakusha, Japan

[22] Filed: Jan. 5, 1973

[21] Appl. No.: 321,311

[52] U.S. Cl. .................................. 305/11, 267/161
[51] Int. Cl. ............................................. F16j 15/38
[58] Field of Search .............. 305/11; 267/161, 162

[56] References Cited
UNITED STATES PATENTS

| | | | |
|---|---|---|---|
| 2,733,567 | 2/1956 | Zellweger | 305/11 X |
| 3,050,346 | 8/1962 | Simpson | 305/11 |
| 3,392,984 | 7/1968 | Reinsma | 305/11 |
| 3,480,338 | 11/1969 | Durham | 305/11 |
| 3,614,113 | 10/1971 | Burk | 305/11 |
| 3,682,466 | 8/1972 | Huchette | 267/161 |
| 3,781,066 | 12/1973 | Deli | 305/11 |

Primary Examiner—Philip Goodman
Attorney, Agent, or Firm—Armstrong, Nikaido & Wegner

[57] ABSTRACT

Dust seal for endless tracks of a tractor having a pin, a first link secured to the pin and having an annular recess, a bushing rotatably engaged with the pin and projected at one end into the recess of the first link to form a counter bore portion, and a second link secured to the bushing, which has a pair of leaf springs disposed in the counter bore portion, and a spacer contacted with the end surface of the bushing at one side and with the bottom surface of the recess of the first link at the other side both contacts in a manner linear between the leaf springs at the part of projection thereof and made of different material from that of the leaf spring. Thus, the sealing function of the dust seal may be maintained for long time even when one link is vibrated with the pin.

7 Claims, 6 Drawing Figures

DUST SEAL FOR ENDLESS TRACKS OF A TRACTOR

This invention relates to tracks of a tractor, and more particularly to improvements in a dust seal for endless type tracks of a tractor.

In the conventional dust seal for endless tracks of a tractor, a synthetic resin member and a sponge rubber member are disposed between the counter bore portion formed by one link engaged with a pin and the bushing rotatably engaged with such a pin and mounting the other link. Alternatively, leaf springs made of wear resistant metal are disposed between such elements, or a wear resistant metal plate, non-metal member and rubber O-ring are disposed therebetween. However, since these types of inserts are too soft, they cannot endure the thrust that will occur, and accordingly early failure of the dust seal happens with the result that it can be anticipated that the side surfaces of the links will be worn. Since the second conventional type of dust seal identified above receives the thrust directly on the pressure surface of the leaf springs, it wears early and loses its sealing characteristics.

This invention contemplates the elimination of the aforementioned disadvantages of the conventional dust seal of the endless tracks of a tractor and to provide an improved dust seal for such endless tracks.

It is an object of the present invention to provide a dust seal for the endless tracks of a tractor which will maintain its sealing function for long time.

It is another object of the present invention to provide a dust seal for the endless tracks of a tractor which has separate sealing portions that function respectively when one link vibrates together with a bushing or when the other link vibrates together with a pin.

It is a further object of the present invention to provide a dust seal for the endless tracks of a tractor which will always receive the thrust through a spacer.

It is still another object of the present invention to provide a dust seal for the endless tracks of a tractor which will be structurally adapted to the broadened counter bore occupied by leaf spring elements when an outward force applied against the bushing broadens the counter bore portion.

According to one aspect of the present invention, there is provided a dust seal for the endless tracks of a tractor where there is a pin, a first link secured to the pin and having an annular recess, a bushing rotatably engaged with the pin and projected at one end into the recess of the first link to form a counter bore portion, and a second link secured to the bushing, which dust seal comprises a pair of leaf springs disposed in the counter bore portion, and a spacer contacted with the end surface of the bushing at one side and with the bottom surface of the recess of the first link at the other side both contacts in a linear manner between the leaf springs at the point of projection of the bushing where the spacer is made of different material than the leaf spring.

One characteristic feature of the dust seal of the present invention is such that the material of the spacer is different from that of the leaf springs and may particularly be made of hard synthetic resin so as to reduce the wear between track elements.

Another characteristic feature of the dust seal of the present invention is such that a pair of leaf springs are disposed both sides of spacer element, and accordingly even if the counter bore portion is broadened by any thrust applied outwardly to the bushing, the leaf springs will also broaden to continue maintaining its sealing function.

Still another characteristic feature of the dust seal of the present invention is such that the leaf springs have tapered surfaces so as to maintain linear contact with the end of the bushing and the recess of the link in order that the spacer shall receive the thrust applied to the link with the result that the surface pressure of the sealing surfaces of the leaf springs and the spacer does not become intolerably high.

These and other objects, features and advantages of the present invention will become more apparent from the following description taken in conjunction with the accompanying drawings, in which.

In order to establish a better understanding of the dust seal of the present invention, a conventional dust seal will now be described with reference to FIGS. 1 to 3, which show conventional examples of a dust seal.

Figure 1:
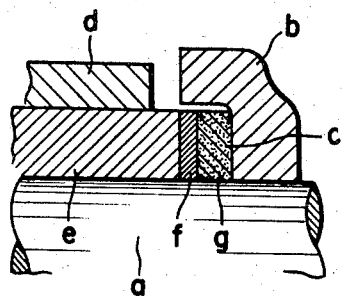
FIGS. 1 to 3 are longitudinal sectional views of the conventional dust seal for the endless tracks of the tractor.
Figure 2:
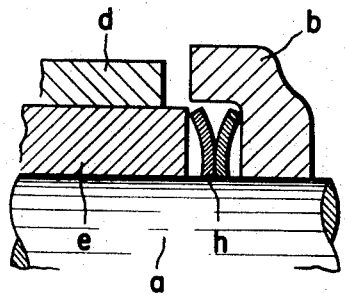
Figure 3:
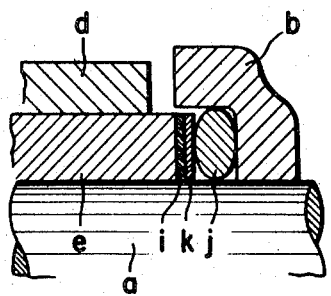

As shown in FIG. 1, in the conventional dust seal for the endless tracks of a tractor, a synthetic resin member $f$ and a sponge rubber member $g$ are disposed between the counter bore portion formed by one link $b$ engaged with a pin $a$ and the bushing $e$ rotatably engaged with the pin $a$ and mounting the other link $d$, or as shown in FIG. 2, leaf springs $h$ made of wear resistant metal are disposed between the links, or as shown in FIG. 3, a wear resistant metal plate $i$, non-metal member $k$ and rubber O-ring $k$ are disposed between the links. However, since these types of seals are too soft, they cannot endure the thrust, and accordingly early failure of the dust seal occurs with the result that it can be anticipated that the side surfaces of the links will become worn.

Figure 4:
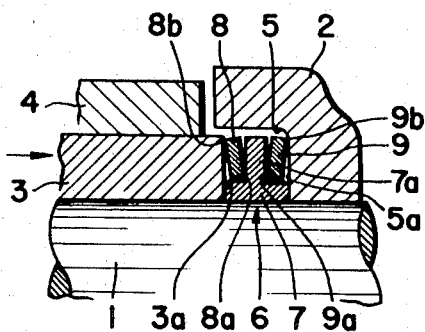
FIGS. 4 and 5 are longitudinal sectional view of one embodiment of the dust seal for tracks of a tractor according to the present invention.
Figure 5:
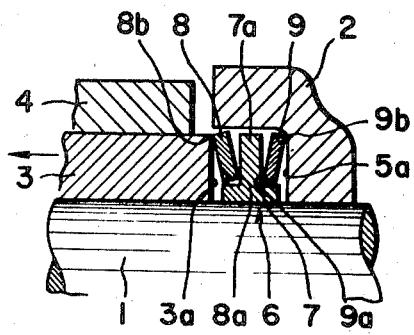
Figure 6:
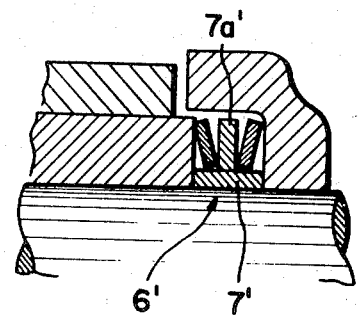
FIG. 6 is a longitudinal sectional view of another embodiment of the dust seal of the present invention.

Reference is now made to FIGS. 4 to 6, and particularly to FIGS. 4 and 5, which show one embodiment of the dust seal for endless tracks of a tractor of the present invention.

One link 2 of a track is engaged with both ends of a pin 1, and a bushing 3 is rotatably engaged with the pin 1, and the other link 4 of another track is mounted to the bushing 3. An annular recess 5 is formed on the inside surface of the link 2. The end of the bushing 3 is projected outwardly from the link 4 into the recess 5 to form a counter bore portion. A spacer 6 is disposed in the counter bore, and has a spacer body 7 and annular projection 7a formed outer periphery thereof. Both ends of the spacer body 7 are contacted with the end surface 3a of the bushing 3 and with the surface of bottom 5a of the recess 5 of the link 2. Leaf springs 8 and 9 are disposed in the counter bore portion in such a manner that the insides thereof facing opposite to the projection 7a of the spacer 6 are tapered so that they are contacted linearly with the projection 7a only at the inner peripheral edges of the tapered surfaces 8a and 9a thereof. The outsides of the leaf springs 8 and 9 are contacted with the end surface 3a of the bushing 3 and the surface 5a of the recess 5. The spacer 6 is made of a material different from that of the leaf springs 8 and 9 such as a hard synthetic resin.

In operation of the thus constructed dust seal for the tracks of a tractor, the thrust force acting onto both links 2 and 4 is received by the spacer body 7 of the spacer 6, but it does not act upon the leaf springs 8 and 9 so that the pressure surface between the leaf springs 8 and 9 and the projection 7a of the spacer 6, that is, the surface pressure of the sealing surface therebetween does not become high, but is always constant. When the link 4 vibrates together with the bushing 3, the pressure contact between the leaf spring 8 and the projection 7a of the spacer 6 maintains its sealing condition, and further when the link 2 vibrates together with the pin 1, the pressure contact between the leaf spring 9 and the projection 7a of the spacer 6 maintains its sealing property. Since the material of the leaf springs 8 and 9 is different from that of the projection 7a of the spacer 6, the wear of the leaf springs 8 and 9 is reduced.

Even if the thrust force acts upon the bushing 3 as designated by an arrow in FIG. 5 so that the bushing 3 moves with the result that the counter bore portion is broadened, the leaf springs 8 and 9 follow through to return so that the inner peripheral edges 8a and 9a of the leaf springs 8 and 9 urge onto the projectionn 7a of the spacer 6 and the outer peripheral edges 8b and 9b of the leaf springs 8 and 9 urge onto the end surface 3a of the bushings 3 and the surface or bottom 5a of the recess 5 so as to prevent earth and sand from entering thereinto.

Referring now to FIG. 6, which shows another embodiment of the dust seal of the present invention, in comparison with the first embodiment of the dust seal, and where the spacer body 7' and the projection 7a' of the spacer 6 are separated, but the other constitution is the same as that of the previous embodiment.

It should be understood from the foregoing description that, since the leaf springs are formed with a taper and contacting the end surface of the bushing and the recess of the link, and have the spacer disposed between the leaf springs in linear contact with the tapered surfaces of the leaf springs and are different in material from that of the leaf springs are disposed in the counter bore portion of the dust seal, the spacer receives the thrust force acting upon the links so that the thrust force does not act upon the leaf springs with the result that the contact between the leaf springs and the spacer, that is, the surface pressure of the sealing surface does not become high. It should also be understood that since the material of the leaf springs is different from that of the spacer, the heat due to wear does not take place early in the life of the elements. Further, it should also be understood that since the contact between one leaf spring and the spacer acts as a sealing function when one link vibrates together with the bushing, and since the contact between the other leaf spring and the spacer acts also as a sealing function when the other link vibrates together with the bushing, wear on the sealing surface is reduced so as to hold the sealing function for a long time.

It should also be understood that since the leaf springs follow the broadened counter bore portion caused by the thrust force acting upon the bushing, the sealing function of the dust seal is maintained for a long time.

What is claimed is:

1. A dust seal for endless tracks of a tractor composed of a pin, a first link secured to said pin and having an annular recess, a bushing rotatably engaged with said pin and projected at one end into the recess of said first link to form a counter bore portion, and a second link secured to said bushing, comprising a pair of resilient members disposed in the counter bore portion, and a spacer means contacted with the end surface of said bushing on one side and with the inside surface of the recess of said first link at the other side with both contacts in a linear manner at a point on the projection of the bushing.

2. A dust seal as set forth in claim 1, wherein a projection on said spacer means is separate from the spacer body and adjoins it only on one side.

3. A dust seal as set forth in claim 1, wherein the material of said spacer is different from that of said resilient member.

4. A dust seal as set forth in claim 1, wherein the resilient member is a leaf spring.

5. A dust seal as set forth in claim 3, wherein the spacer is composed of a hard, synthetic resin.

6. A dust seal as set forth in claim 1, wherein the spacer means is composed of a main body portion and an annular projection perpendicular to said body portion.

7. A dust seal for endless tracks of a tractor composed of a pin, a first link secured to said pin and having an annular recess, a bushing rotatably engaged with said pin and projected at one end into the recess of said first link to form a counter bore portion, and a second link secured to said bushing, comprising a pair of leaf springs disposed in the counter bore portion, and a spacer disposed in the counter bore portion and having a spacer body and annular projection formed on the outer periphery of the spacer body in a manner that both ends of the spacer body are contacted with the end surface of said bushing and with the surface of a bottom area of the recess of said first link and wherein inside surfaces of said leaf springs faceing opposite to the projection of said spacer are tapered so that they are contacted linearly with the projection at the inner peripheral edges of the tapered surfaces of said springs, respectively.

* * * * *